United States Patent [19]
Wu et al.

[11] Patent Number: 5,275,351
[45] Date of Patent: Jan. 4, 1994

[54] CONSTANT TAPE SPEED CONTROLLER

[75] Inventors: Tzong-Sheau Wu, Changhua; Jing-Chung Shen, Nantou, both of Taiwan

[73] Assignee: Industrial Technology Research Institute, Taiwan

[21] Appl. No.: 875,810

[22] Filed: Apr. 30, 1992

[51] Int. Cl.$^5$ .................. G11B 15/46; G11B 27/22
[52] U.S. Cl. .................. 242/191; 360/73.05; 360/73.14
[58] Field of Search .................. 242/191, 75.1; 360/73.05, 73.06, 73.09, 73.14

[56] References Cited

U.S. PATENT DOCUMENTS

| | | |
|---|---|---|
| 4,479,159 | 10/1984 | Kamei et al. .................. 242/191 X |
| 4,496,112 | 1/1985 | Olsson et al. .................. 242/66 |
| 4,620,241 | 10/1986 | Ono . | |
| 4,777,413 | 10/1988 | Yoshimura et al. . | |
| 4,794,473 | 12/1988 | Kawasaki . | |
| 4,805,053 | 2/1989 | Yamanaka et al. .................. 242/191 X |
| 4,965,874 | 10/1990 | Yamazaki .................. 360/73.09 X |
| 4,989,112 | 1/1991 | Hamoda . | |
| 5,018,040 | 5/1991 | Nishida .................. 242/191 X |

Primary Examiner—Daniel M. Yasich
Attorney, Agent, or Firm—Meltzer, Lippe, Goldstein, Wolf, Schlissel & Sazer

[57] ABSTRACT

An apparatus and method are disclosed for advancing a tape at a constant, high speed. Two detectors are provided for detecting values representative of the rotational periods of the reels at both low and high tape advance speeds. A calculator is included for determining particular arithmetic functions of these values. A comparator is also provided, which has a memory for storing a parameter dependent on a particular arithmetic function of values representative of low speed rotational periods of the reels. The comparator is provided for comparing the results of a particular arithmetic function of values representative of high speed rotational periods of the reels with the parameter and for outputting an error signal for adjusting the tape advance speed to maintain a constant, high speed.

14 Claims, 3 Drawing Sheets

CONSTANT TAPE SPEED CONTROLLER

FIELD OF THE INVENTION

The present invention relates to a device for controlling the travel speed of a tape, such as within a magnetic tape recorder/playback device during a high speed search or fast feed.

BACKGROUND OF THE INVENTION

A conventional tape transport device, such as the tape transport device used in a magnetic tape recorder/player 10, is schematically depicted in FIG. 1. Tape 11, which is supplied from a supply reel 12, is fed between a capstan 13 and pinch roller 14 assembly to a take up reel 15. In the operation of the recorder/player, the tape 11 is fed at varying speeds between the reels 12, 15. For normal speeds, and speeds up to approximately twenty times normal, the tape 11 is advanced by a capstan motor 16 connected to the capstan-pinch roller assembly 13–14. Such speeds are considered low operating speeds.

When using the capstan-pinch roller assembly 13–14 to advance the tape 11, the tape speed remains relatively constant. When it is desired to advance the tape 11 at a high speed, such as 100 to 200 times the normal speed, the capstan-pinch roller assembly 13–14 is not used. Rather, the tape 11 is typically advanced at high speeds by a drive mechanism connected to one of the reels 12 or 15.

In the prior art, the tape advance rate at high speeds was kept constant by maintaining a certain relationship between the rotational periods of the supply and take-up reels. In FIG. 2, a cross-sectional segment of the tape 11 is shown having a thickness t. The tape itself has a total length L and L>>t. Assuming that the length L and thickness t are uniform and unchanging in FIG. 1, the tape has a fixed cross-sectional area of Lt. Further, this area must be constant at any given moment regardless of how much tape is wound on each reel. If at a particular moment, the outer radius of the supply reel is $r_S$ and the outer radius of the take up reel is $r_T$ (each reel having a minimum inner radius of r), then the following equation relates the areas of tape on each reel to the total cross-sectional area:

$$\pi(r_T^2 - r^2) + \pi(r_S^2 - r^2) = Lt \quad (1)$$

because the amount of tape between the reels is negligible. Further, if the rotational period of the take-up and supply reels are represented by $T_T$ and $T_S$, respectively, then the following relationship is also true:

$$\frac{2\pi r_T}{T_T} = \frac{2\pi r_S}{T_S} = V_T \quad (2)$$

where $V_T$ is the tape speed. Equations (1) and (2) can be combined to yield:

$$V_T = \frac{(4\pi Lt + 8\pi^2 r^2)^{\frac{1}{2}}}{(T_T^2 + T_S^2)^{\frac{1}{2}}} \approx \frac{(4\pi Lt + 8\pi^2 r^2)^{\frac{1}{2}}}{T_T + T_S} \quad (3)$$

An examination of the right hand side of equation (3) reveals that only the terms in the denominator vary as tape is transported from one reel to another. Hence, the prior art attempted to maintain the constancy of the high speed tape advance by maintaining a constant relationship between the sum of the squares of the rotational periods or the sum of the rotational periods of the reels.

This solution proves problematic for the conventional tape player/recorder. As noted above, the speed of a particular tape is a function of both the thickness and length (e.g., 30, 60 90, 120, etc. minutes) of the tape. Since a conventional tape player/recorder accepts tapes with varying lengths and thicknesses, the constancy of higher advance speeds cannot easily be maintained universally for all tapes.

It is therefore an object of the present invention to provide a high speed controller which maintains the tape advance at a constant rate. It is a further object to provide a constant tape speed controller which uniformly maintains a constant tape speed regardless of the length or thickness of the tape used in the playback/recorder.

SUMMARY OF THE INVENTION

These and other objects are achieved by the present invention which provides an apparatus and method for advancing a tape from a supply reel to a take-up reel at a constant high tape advance speed. First and second detectors are respectively connected to the supply and take-up reels for detecting a value representative of the rotational period of each reel. A calculator is provided for computing particular arithmetic functions of those detected values at both low and high tape advance speeds. The invention also has a comparator connected to the calculator. The comparator has a memory for storing a parameter dependent on a particular arithmetic function of the values which are representative of the detected low speed rotational periods. The comparator is provided for comparing the results of a particular arithmetic function of the values representative of the detected high speed rotational periods with the parameter. The comparator is also used for outputting an error signal for adjusting the tape advance speed in order to maintain a constant, high tape advance speed.

In accordance with the invention, the parameter may illustratively be determined from equation (3). For a tape of any thickness, an arbitrary tape speed $V_T$ is related to the take-up reel and supply reel rotational periods by equation (3). A ratio $V_H^*/V_L$ may be formed between a low tape speed, represented by $V_L$, and a desired high tape speed, represented by $V_H^*$. Substituting equation (3) into this ratio, the following relates the low speed take-up and supply rotational periods, represented by $T_{LT}$ and $T_{LS}$ to the desired high speed take-up and supply rotational periods, represented by $T_{HT}^*$ and $T_{HS}^*$:

$$V_H^*/V_L = \frac{(T_{LT}^2 + T_{LS}^2)^{\frac{1}{2}}}{(T_{HT}^{*2} + T_{HS}^{*2})^{\frac{1}{2}}} \quad (4a)$$

or, $$(V_H^*/V_L)^{-2}(T_{LT}^2 + T_{LS}^2) = T_{HT}^{*2} + T_{HS}^{*2} \quad (4b)$$

This relationship may be used to determine the parameter which illustratively may be set equal to the left-hand side of equation (4b). More specifically, with a given desired ratio of $V_H^*/V_L$ and with the quantity $T_{LT}^2 + T_{LS}^2$ determined at low speed operation, the parameter which corresponds to a desired value for $T_{HT}^{*2} + T_{HS}^{*2}$ may be obtained.

Thus, in accordance with an illustrative embodiment of the invention, to use the present invention, the tape recorder/playback device is first operated at a low speed and $T_{LS}^2 + T_{LT}^2$ is determined. Using a desired ratio $V_L/V_H^*$ and $T_{LS}^2 + T_{LT}^2$, a parameter representative of a desired value of $T_{HS}^{*2} + T_{HT}^{*2}$ is determined. This parameter is stored. Then, the tape device is operated at a high speed. The actual value of $T_{HS}^2 + T_{HT}^2$ is determined and compared with the desired value stored in the memory and an error signal is generated to change the actual speed of the tape to try to change the actual value of $T_{HS}^2 + T_{HT}^2$ to be equal to the desired value. When the actual value of $T_{HS}^2 + T_{HT}^2$ is equal to the desired value, the desired speed $V_H^*$ is achieved.

DETAILED DESCRIPTION OF THE INVENTION

Figure 1:
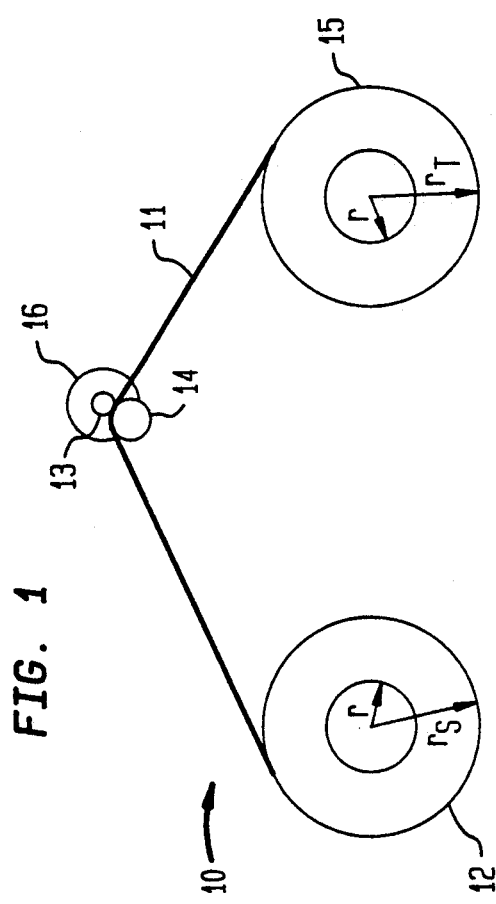
FIG. 1 schematically depicts a conventional tape transport device.
Figure 2:
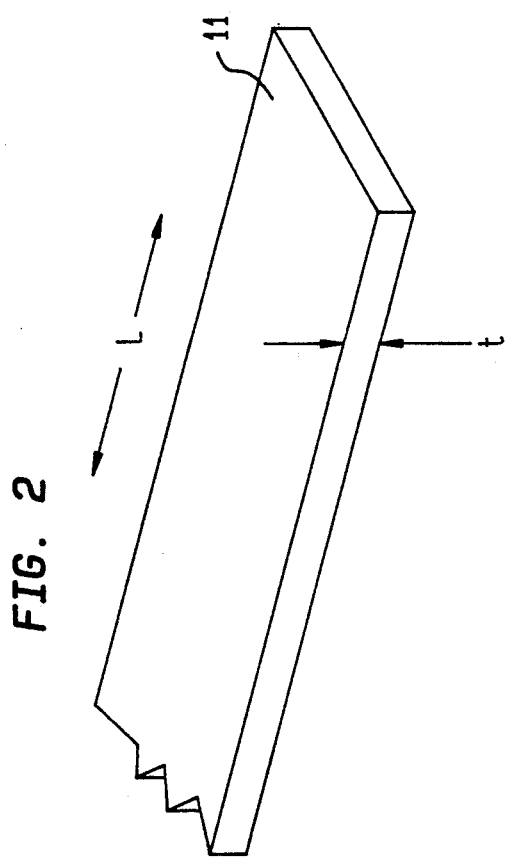
FIG. 2 depicts a segment of tape.
Figure 3:
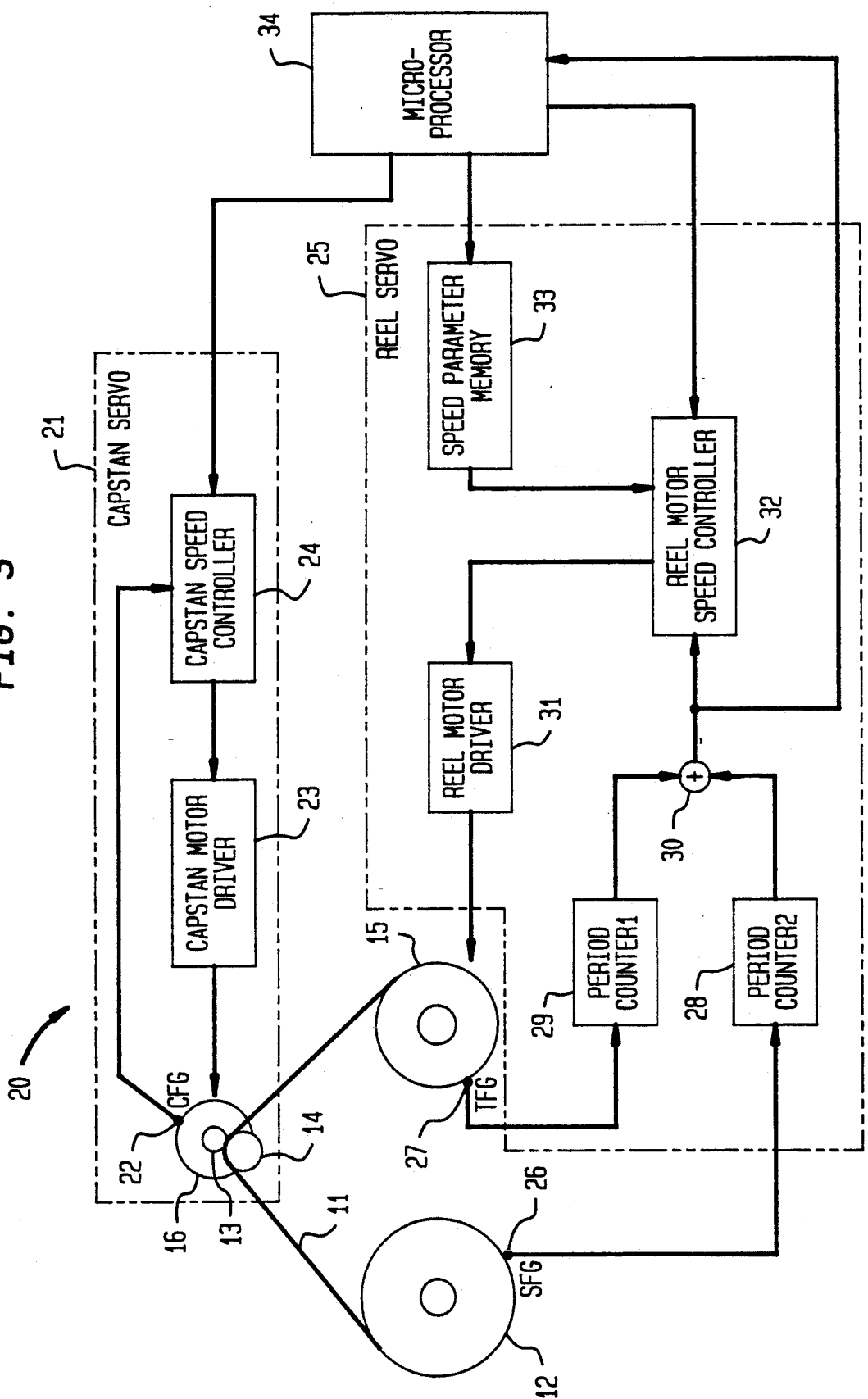
FIG. 3 depicts a first embodiment of the present invention.

Referring now to FIG. 3, a controller 20 according to one embodiment of the invention is depicted. The controller has a capstan servo 21 for low speed tape advances, a reel servo 25 for high speed tape advances and a processor 34 for controlling the servos 21, 25. The capstan servo 21 includes a capstan frequency generator 22 (CFG) for determining the actual rotational period of the capstan 13. The CFG transmits a signal indicative of the actual capstan rotational period to a capstan speed controller 24 which compares the actual capstan rotational period with a desired capstan rotational period. Preferably, the capstan speed controller 24 operates under the control of the processor 34 which may, among other things, set the desired capstan rotational frequency. The results of this comparison are transmitted from the capstan speed controller 24 to the capstan motor driver 23 which accordingly adjusts the speed of the capstan motor 16 to achieve the desired tape speed.

The reel servo 25 comprises a supply reel frequency generator 26 (SFG) and a take-up reel frequency generator 27 (TFG) for respectively determining the rotational periods of the supply 12 and take-up 15 reels. Each frequency generator 26, 27 transmits a signal indicative of the rotational period of its respective reel to a respective period counter 28 or 29.

The period counters 28, 29 convert the signal transmitted by the SFG 26 or TFG 27 to rotational periods. The rotational periods of each reel 12, 15 are outputted to a calculator 30 which determines a particular arithmetic function of the periods which is useful for controlling the speed of the reels. Illustratively, the calculator outputs the value $S_L = T_{LT}^2 + T_{LS}^2$ where $T_{LT}$ and $T_{LS}$ are the low speed rotational periods of the take-up 15 and supply 12 reels, respectively, and $S_L$ is the sum of the squares of those low speed rotational periods. The sum of squares value $S_L$ is transmitted to the processor 34.

The processor 34 uses the calculated value $S_L$ to set a reel motor speed parameter which is stored in a speed parameter memory 33. The reel motor speed controller 32 compares the parameter stored in the speed parameter memory 33 and the calculated values of the calculator 30 to produce an error signal which reflects the difference between the two. This error signal is transmitted to a reel motor driver 31 which accordingly adjusts the reel speed to achieve a desired high tape advance speed.

The operation of the invention is now discussed. Suppose it is desired to run the tape at a desired high speed $V_H^*$. Initially, the processor 34 engages the capstan servo 21 to drive the tape 11 at a particular low speed $V_L$ in order to determine the relative rotational periods of the reels 12, 15. For example, if $V_H^* = 128$ times normal speed then the processor 34 illustratively causes the capstan servo to drive the tape at $V_L = 16$ times normal speed.

As the capstan motor 16 spins the capstan 13 to advance the tape at a low speed $V_L$, the CFG 22 continuously transmits a signal indicative of the rotational period of the capstan 13. The capstan speed controller 24 receives this signal and a signal from the processor 34 indicative of the desired low tape speed $V_L$ (i.e., sixteen times the normal speed). An error signal is produced and transmitted to the capstan motor driver 23 which adjusts the capstan motor 16 speed to achieve the desired low tape speed $V_L$.

Meanwhile, the supply and take-up reels 12, 15 rotate as tape 11 is transported from the former to the latter by means of the capstan-pinch roller assembly 13-14. In response to the rotation of the reels, the SFG 26 and TFG 27 generate signals indicative of the periods of their respective reels 12 or 15 which reflect the speed of these reels 12, 15. These generated signals are respectively transmitted to the period counters 28, 29 where they are converted to the low speed take-up reel period $T_{LT}$ and the low speed supply reel period $T_{LS}$.

The calculator 30 receives, and computes an arithmetic function of, these periods. Illustratively, the following function is computed: $S_L = T_{LT}^2 + T_{LS}^2$. Alternatively, the sum of the periods $T_{LT} + T_{LS}$ may be computed. At this stage of the operation of the controller 20, the calculated sum of squares $S_L$ is transmitted to the processor 34. When the processor 34 receives the low speed sum of squares $S_L$, it disengages the low speed tape advance of the capstan servo 21.

Using $S_L$, the processor 34 computes a parameter for use in maintaining a constant, high tape speed. Illustratively, the parameter is a desired sum of squares for a high speed tape advance designated $S_H^*$ (where $S_H^* = T_{HT}^{*2} + T_{HS}^{*2}$ and $T_{HT}^*$ and $T_{HS}^*$ are the desired high speed rotational periods of the take-up and supply reels, respectively) and is computed from the following equation which is derived from equations (4a)–(4b):

$$S_H^* = S_L k^2 \tag{5}$$

In equation (5), k is the ratio of the actually detected low tape advance speed $V_L$ to the desired high tape advance speed $V_H^*$, i.e., $k = V_L/V_H^*$. In an alternative embodiment, where $S_L = T_{LS} + T_{LT}$ is calculated, $S_H^*$ is set equal to $S_L k$. $S_H^*$ is the parameter which is loaded into the speed parameter memory 33.

After storing the parameter $S_H^*$, the processor 34 engages the reel servo 25 so that one of the reels 12 or 15 drives the tape at a high speed. The SFG 26 and TFG 27, in conjunction with the period counters 28 and 29, determine the actual high speed rotational periods $T_{HS}$ and $T_{HT}$ of the reels 12 and 15, respectively. The calculator 30 uses these periods to compute an arithmetic function. Continuing with the above example, the sum of the squares of the actual periods, i.e., $S_H = T_{HT}^2 + T_{HS}^2$, is computed. Again, in an alternative embodiment, where $S_L = T_{LS} + T_{LT}$ and $S_H^* = S_L k$, $S_H$ is computed as $T_{HT} + T_{HS}$. This time, the reel motor speed controller 32 receives the actual detected high speed sum of squares $S_H$ and compares it with the parameter stored in the speed parameter memory, i.e., the desired high speed sum of squares $S_H^*$. An error signal is produced reflecting the discrepancy between the actual detected sum of squares value $S_H$ and the desired sum of squares parameter $S_H^*$ which is transmitted to the reel motor driver 31. The reel motor driver 31 adjusts the reel speed accordingly to achieve the desired tape transport speed $V_H^*$.

It may be appreciated that the SFG 26 and TFG 27 continually transmit signals indicative of the rotational period of their respective reels. Thus, the high speed tape advance may be continually maintained at a desired, constant rate $V_H^*$.

Figure 4:
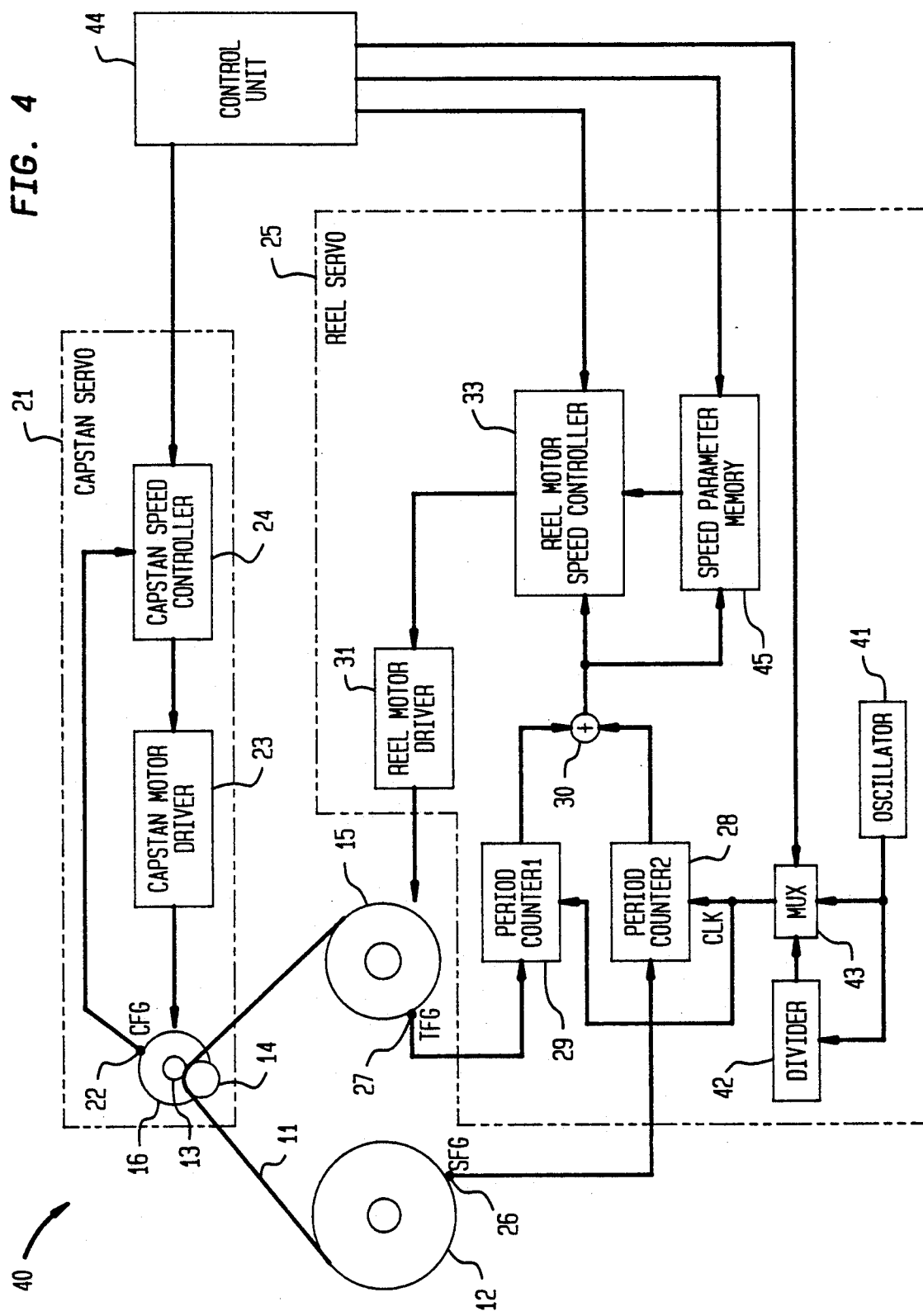
FIG. 4 depicts a second embodiment of the present invention.

Turning now to FIG. 4, a second embodiment 40 according to the present invention is now discussed. The second embodiment 40 is similar to the first embodiment 20 with a few differences. Firstly, the speed parameter memory 45 is connected directly to the calculator 30 for receiving and storing a value directly from the calculator 30 under the supervision of the processor 44. The processor 44, need not be a microprocessor (i.e., no longer requires a complicated arithmetic logic unit) but may be a simpler control unit.

An oscillator 41 is provided which generates a signal with a constant period T and transmits this signal to a multiplexer 43 and to a frequency divider 42. The frequency divider 42 produces an output signal having a period nT which is a multiple n of the oscillator 41 period T. This signal is additionally inputted to the multiplexer 43. The multiplexer 43 operates under the control of the processor 44 and selects the oscillator 41 signal or the frequency divider 42 signal for output depending on a control signal transmitted from the processor 44. The signal outputted from the multiplexer 43 is inputted to each period counter 28 and 29 and serves as a base period for determining the rotation periods of the reels 12, 15. Thus, the rotational period counters 28 and 29 do not output the rotational periods. Rather, the period counters 28, 29 output a base period factor which, when multiplied by the base period, yields the particular rotational period of the supply or take-up reel $T_S$ or $T_T$. In other words, if the base period is T, the supply reel period counter 28 outputs a factor $x_S$ and the take-up reel period counter 29 outputs a factor $x_T$ where $T_S = x_S T$ and $T_T = x_T T$.

The operation of the second embodiment is now briefly discussed insomuch as it differs from the operation of the first embodiment. By virtue of including a selectable base period of either T or nT, the required calculations for computing the desired high rotational period parameter may be simplified. Suppose that the base period T is used for high speed rotational period determinations and nT for low speed period determinations. Using the above relationships the sum of the squares of the low speed base period factors $Y_L$, the sum of the squares of the actually detected high speed base period factors $Y_H$ and the sum of the squares of the desired high speed base period factors $Y_H^*$ may be computed similar to $S_L$, $S_H$ and $S_H^*$. Thus:

$$Y_L = x_{LS}^2 + x_{LT}^2 \tag{6a}$$

$$Y_H = x_{HS}^2 + x_{HT}^2 \tag{6b}$$

$$Y_H^* = x_{HS}^{*2} + x_{HT}^{*2} \tag{6c}$$

In equations (6a), (6b) and (6c), $x_{LS}$ is the base period factor of the supply reel detected at a low speed, $x_{LT}$ is the base period factor of the take-up reel detected at a low speed, $x_{HS}$ is the actual base period factor of the supply reel detected at high speed, $x_{HT}$ is the actual base period factor of the take-up reel detected at high speed, $x_{HS}^*$ is the desired high speed base period factor of the supply reel and $x_{HT}^*$ is the desired high speed base period factor of the take-up reel. Thus:

$$T_{LS} = x_{LS} nT \tag{7a}$$

$$T_{LT} = x_{LT} nT \tag{7b}$$

$$T_{HS} = x_{HS} T \tag{7c}$$

$$T_{HT} = x_{HT} T \tag{7d}$$

$$T_{HS}^* = x_{HS}^* T \tag{7e}$$

$$T_{HT}^* = x_{HT}^* T \tag{7f}$$

Recalling that:

$$S_H^* = S_L k^2 \tag{8}$$

the period nT may be factored out of the right hand side and the period T out of the left hand side, or:

$$x_{HS}^{*2} + x_{HT}^{*2} = n^2 k^2 (x_{LS}^2 + x_{LT}^2) \tag{9}$$

which reduces to:

$$Y_H^* = Y_L n^2 k^2 \tag{10}$$

Equation (10) has one parameter, n, which may be set to any desired value. It may be appreciated from equation (10), that by setting the multiple n of the frequency divider 42 equal to $V_H^*/V_L$, that the sum of the squares of the detected low speed base period factors $Y_L$, will be equal to the sum of the squares of the desired high speed base period factors $Y_H^*$. In other words, by judicious selection of n (i.e., equal to $V_H^*/V_L$), $Y_H^*$ may be easily calculated directly from $Y_L$ without a multiplication step (i.e., since $Y_H^* = Y_L$, no multiplication is required).

Assume, as with the first embodiment 20, that it is desired to advance the tape at a desired high speed $V_H^*$. Initially, the capstan servo 21 is engaged to drive the tape at a low speed $V_L$. The processor 44 causes the multiplexer 43 to select the signal of the frequency divider which has a base period nT, where $n = V_H^*/V_L$. For instance, if $V_L = 16$ times normal speed and $V_H^* = 128$ times normal speed, the rotational period counters 28 and 29 have a base period 8T. The period counters 28, 29 output the detected low speed base period factors $x_{LS}$ and $x_{LT}$. The calculator 30 receives these factors and computes the sum of the squares of the detected low speed base period factors $Y_L = x_{LS}^2 + x_{LT}^2$. This value is transmitted directly to the speed parameter memory 45. Once received, the control unit 44 disengages the capstan servo 21.

Next, the reel servo 25 is engaged to advance the tape at a high speed. The control unit 44 causes the multiplexer 43 to select the signal of the oscillator 41 as the base period of the period counters 28, 29. As discussed in detail above, the period counters 28, 29 thus have a base period of T which is used to determine the actual detected high speed base period factors $x_{HS}$ and $x_{HT}$. These factors are fed to the calculator 30 which outputs the sum of their squares $Y_H = x_{HS}^2 + x_{HT}^2$. This actual detected sum of the squares of the high speed base period value is transmitted to the reel motor speed controller 32, which compares it with the parameter stored in the speed parameter memory 45. As described in detail above, because the parameter $Y_L$ stored therein equals the sum of the squares of the desired high speed base period factors $Y_H^*$, it may be used to determine the discrepancy between the actual tape speed and the desired tape speed. Thus, by using two different periods T and nT as base periods for the period counters 28, 29, the same result is achieved as with the first embodiment without performing a multiplication. This is desirable in the preferred embodiment so that a less sophisticated and cheaper processor 44 may be used.

Finally, the aforementioned embodiments are intended to be merely illustrative. Numerous alternative embodiments may be devised by those ordinarily skilled in the art without departing from the spirit and scope of the following claims.

We claim:

1. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors, for computing a sum function, which depends only on said values that are representative of the rotational periods of said reels determined by said first and second detectors, of said first and second sets of values representative of the rotational periods detected at low and high tape advance speeds; and comparison means, connected to said calculator and having a storage means for, prior to advancing said tape at a high tape advance speed, storing a parameter indicative of said desired high tape advance speed which parameter is proportional to said sum function of said first set of values representative of the rotational periods detected at a low tape advance speed, said comparison means for, after said parameter is stored in said storage means, comparing results of said sum function of said second set of values representative of the rotational periods detected at high tape advance speed with said parameter and generating an error signal for adjusting the tape advance speed to maintain a constant, high tape advance speed.

2. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors for computing a sum function of said first and second sets of values representative of the rotational periods detected at low and high tape advance speeds;

comparison means, connected to said calculator and having a storage means for storing a parameter indicative of said desired high tape advance speed which parameter is proportional to said sum function of said first set of values representative of the rotational periods detected at a low tape advance speed, said comparison means comparing results of said sum function of said second set of values representative of the rotational periods detected at high tape advance speeds with said parameter and generating an error signal for adjusting the tape advance speed to maintain a constant, high tape advance speed, wherein said first set of values representative of the rotational periods at a low tape advance speed contains first and second base period factors equal to said low tape advance speed rotational periods divided by the product of a base period multiplied with a ratio of a desired high tape advance speed to said low tape advance speed, wherein said second set of values representative of said high tape advance speed contains third and fourth base period factors equal to said high tape advance speed rotational periods divided by said base period and wherein said parameter equals the sum of the squares of said first and second base period factors.

3. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors for computing a sum function of said first and second sets of values representative of the rotational periods detected at low and high tape advance speeds;

comparison means, connected to said calculator and having a storage means for storing a parameter indicative of said desired high tape advance speed which parameter is proportional to said sum function of said first set of values representative of the rotational periods detected at a low tape advance speed, said comparison means comparing results of said sum function of said second set of values representative of the rotational periods detected at high tape advance speeds with said parameter and generating an error signal for adjusting the tape advance speed to maintain a constant, high tape advance speed, wherein said first and second sets of values representative of the rotational periods at low and high tape advance speeds, respectively contain the respective, actually detected rotational periods, said parameter being equal to the sum of the squares of the low tape advance speed rotational periods multiplied by the square of the ratio of the low tape advance speed to the desired high tape advance speed.

4. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors for computing a sum function of said first and second sets of values representative of the rotational periods detected at low and high tape advance speeds;

comparison means, connected to said calculator and having a storage means for storing a parameter indicative of said desired high tape advance speed which parameter is proportional to said sum function of said first set of values representative of the rotational periods detected at a low tape advance speed, said comparison means comparing results of said sum function of said second set of values representative of the rotational periods detected at high tape advance speeds with said parameter and generating an error signal for adjusting the tape advance speed to maintain a constant, high tape advance speed, an oscillator for generating a first signal with a constant period;

a frequency divider responsive to said first signal for generating a second signal having a period which is a fixed multiple of said first signal period; and a multiplexer, receiving said first and second signals as inputs, for outputting said second signal as a base period input of said first and second detectors in response to advancing said tape at a low tape advance speed and for outputting said first signal as the base period input of said first and second detectors in response to advancing said tape at a high tape advance speed.

5. The apparatus of claim 4 wherein said frequency divider generates a second signal having a period equal to said first signal period multiplied with the ratio of said desired high tape advance speed to said low tape advance speed.

6. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors for computing a sum function of said first and second sets of values representative of the rotational periods detected at low and high tape advance speeds;

comparison means, connected to said calculator and having a storage means for storing a parameter indicative of said desired high tape advance speed which parameter is proportional to said sum function of said first set of values representative of the rotational periods detected at a low tape advance speed, said comparison means comparing results of said sum function of said second set of values representative of the rotational periods detected at high tape advance speeds with said parameter and generating an error signal for adjusting the tape advance speed to maintain a constant, high tape advance speed, and low tape advance speed drive means for advancing said tape at constant, low tape advance speeds.

7. An apparatus for advancing a tape from a supply reel to a take-up reel at a desired high, constant tape advance speed comprising:

first and second detectors, respectively connected to said supply and take-up reels, for determining a first set of values which are representative of the rotational period of each of the reels at a low tape advance speed and a second set of values which are representative of the rotational period of each of the reels at a high tape advance speed;

a calculator, connected to said first and second detectors for computing a sum function of said first and second sets of values representative of the rotational periods detected at low and high tape advance speeds;

comparison means, connected to said calculator and having a storage means for storing a parameter indicative of said desired high tape advance speed which parameter is proportional to said sum function of said first set of values representative of the rotational periods detected at a low tape advance speed, said comparison means comparing results of said sum function of said second set of values representative of the rotational periods detected at high tape advance speeds with said parameter and generating an error signal for adjusting the tape advance speed to maintain a constant, high tape advance speed, and a processor for controlling said comparison means and the low speed tape advance.

8. An apparatus for advancing a tape from a supply reel to a take-up reel at a constant, desired high tape advance speed comprising:

supply and take-up reel period detectors for determining a first set of values which are representative of the rotational periods of the supply and take-up reels at a low tape advance speed and a second set of values which are representative of the rotational periods of the supply and take-up reels at a high tape advance speed, respectively;

calculator responsive to said supply and take-up reel period detectors for determining a sum function, which depends only on said values that are representative of the rotational periods of said reels determined by said supply and tape-up reel periods detectors, of said first and second sets of values representative of the rotational periods of said reels at both low and high tape advance speeds;

storage means responsive to said calculator for, prior to advancing said tape at a high tape advance speed, storing a parameter indicative of said desired high tape advance speed which parameter is proportional to a low tape advance speed output of said calculator and a ratio of the low tape advance speed at which said calculator output was determined to said desired high tape advance speed; and high speed drive adjustment means responsive to said storage means and said calculator for, after said parameter is stored in said storage means, adjusting the high tape advance speed of said tape to reduce the difference between said parameter stored in said storage means and high tape advance speed outputs of said calculator.

9. An apparatus for advancing a tape from a supply reel to a take-up reel at a constant, desired high tape advance speed comprising:

supply and take-up reel period detectors for determining a first set of values which are representative of the rotational periods of the supply and take-up reels at a low tape advance speed and a second set of values which are representative of the rotational periods of the supply and take-up reels at a high tape advance speed, respectively;

a calculator responsive to said supply and take-up reel period detectors for determining a sum function of said first and second sets of values representative of the rotational periods of said reels at both low and high tape advance speeds;

storage means responsive to said calculator for storing a parameter indicative of said desired high tape advance speed which parameter is proportional to a low tape advance speed output of said calculator and a ratio of the low tape advance speed at which said calculator output was determined to said desired high tape advance speed;

high speed drive adjustment means responsive to said storage means and said calculator for adjusting the high tape advance speed of said tape to reduce the difference between said parameter stored in said storage means and high tape advance speed outputs of said calculator; and an adjustable low tape advance speed drive means for advancing tape between the supply and take-up reels at a constant, low tape advance speed.

10. An apparatus for advancing a tape from a supply reel to a take-up reel at a constant, desired high tape advance speed comprising:

supply and take-up reel period detectors for determining a first set of values which are representative of the rotational periods of the supply and take-up reels at a low tape advance speed and a second set of values which are representative of the rotational periods of the supply and take-up reels at a high tape advance speed, respectively;

a calculator responsive to said supply and take-up reel period detectors for determining a sum function of said first and second sets of values representative of the rotational periods of said reels at both low and high tape advance speeds;

storage means responsive to said calculator for storing a parameter indicative of said desired high tape advance speed which parameter is proportional to a low tape advance speed output of said calculator and a ratio of the low tape advance speed at which said calculator output was determined to said desired high tape advance speed;

high speed drive adjustment means responsive to said storage means and said calculator for adjusting the high tape advance speed of said tape to reduce the difference between said parameter stored in said storage means and high tape advance speed outputs of said calculator; and control means for controlling said storage means, said high speed drive adjustment means and the low tape advance speed of the tape.

11. A method for advancing a tape from a supply reel to a take-up reel at desired constant, high tape advance speed comprising:

(a) detecting a first set of values which are representative of the rotational periods of both the supply and take-up reels at a low tape advance speed;

(b) computing a sum function, which depends only on values detected in step (a), of said first set of values representative of the low tape advance speed rotational periods detected at the supply and take-up reels in a calculator unit;

(c) prior to advancing said tape at a high tape advance speed, storing a parameter indicative of the desired high tape advance speed rotational periods of the supply and take-up reels in a memory, said parameter being proportional to the results of said sum function of said first set of values representative of the low tape advance speed rotational periods detected at the supply and take-up reels;

(d) detecting a second set of values representative of the rotational periods of both the supply and take-up reels at high tape advance speeds;

(e) computing said sum function, which depends only on values detected in step (d) of said second set of values representative of the high tape advance speed rotational periods detected at the supply and take-up reels in a calculator unit; and (f) after storing said parameter in said memory, adjusting the speed of a reel motor in accordance with a discrepancy between the results of said sum function of said second set of values representative of the high tape advance speed rotational periods detected at the supply and take-up reels and said parameter to achieve said desired high tape advance speed.

12. A method for advancing a tape from a supply reel to a take-up reel at desired constant, high tape advance speed comprising:

(a) detecting a first set of values which are representative of the rotational periods of both the supply and take-up reels at a low tape advance speed;

(b) computing a sum function of said first set of values representative of the low tape advance speed rotational periods detected at the supply and take-up reels in a calculator unit;

(c) storing a parameter indicative of the desired high tape advance speed rotational periods of the supply and take-up reels in a memory, said parameter being proportional to said first set of values representative of the low tape advance speed rotational periods detected at the supply and take-up reels;

(d) detecting a second set of values representative of the rotational periods of both the supply and take-up reels at high tape advance speeds;

(e) computing said sum function of said second set of values representative of the high tape advance speed rotational periods detected at the supply and take-up reels in a calculator unit; and (f) adjusting the speed of a reel motor in accordance with a discrepancy between the results of said sum function of said second set of values representative of the high tape advance speed rotational periods detected at the supply and take-up reels and said parameter to achieve said desired high tape advance speed;

wherein step (a) comprises selecting a first signal for use as a base period in detecting said first set of values and wherein step (d) comprises selecting a second signal for use as a base period in detecting said second set of values, said second signal having a period equal to the period of said first signal multiplied with the ratio of the desired high tape advance speed to the low tape advance speed.

13. A method for advancing a tape from a supply reel to a take-up reel at a desired constant, high tape advance speed comprising:
   (a) detecting a first set of values which are representative of the rotational periods of both the supply and take-up reels at a low tape advance speed;
   (b) computing a the sum of the squares of said first set of values representative of the low tape advance speed rotational periods detected at the supply and take-up reels in a calculator unit;
   (c) prior to advancing said tape at a high tape advance speed, storing a parameter indicative of the desired high tape advance speed rotational periods of the supply and take-up reels in a memory, said parameter being proportional to said sum of the squares of said first set of values representative of the low tape advance speed rotational periods detected at the supply and take-up reels;
   (d) detecting a second set of values representative of the rotational periods of both the supply and take-up reels at high tape advance speeds;
   (e) computing the sum of the squares of said second set of values representative of the high tape advance speed rotational periods detected at the supply and take-up reels in a calculator unit; and
   (f) after storing said parameter in said memory, adjusting the speed of a reel motor in accordance with a discrepancy between the results of said sum of the squares of said second set of values representative of the high tape advance speed rotational periods detected at the supply and take-up reels and said parameter to achieve said desired high tape advance speed.

14. A method for advancing a tape from a supply reel to a take-up reel at a desired constant, high tape advance speed comprising:
   (a) detecting a first set of values which are representative of the rotational periods of both the supply and take-up reels at a low tape advance speed;
   (b) computing the sum of said first set of values representative of the low tape advance speed rotational periods detected at the supply and take-up reels in a calculator unit;
   (c) prior to advancing said tape at a high tape advance speed, storing a parameter indicative of the desired high tape advance speed rotational periods of the supply and take-up reels in a memory, said parameter being proportional to the said sum of said first set of values representative of the low tape advance speed rotational periods detected at the supply and take-up reels;
   (d) detecting a second set of values representative of the rotational periods of both the supply and take-up reels at high tape advance speeds;
   (e) computing the sum of said second set of values representative of the high tape advance speed rotational periods detected at the supply and take-up reels in a calculator unit; and
   (f) after storing said parameter in said memory, adjusting the speed of a reel motor in accordance with a discrepancy between the results of said sum of said second set of values representative of the high tape advance speed rotational periods detected at the supply and take-up reels and said parameter to achieve said desired high tape advance speed.

* * * * *